US011210802B2

United States Patent
Guizilini et al.

(10) Patent No.: US 11,210,802 B2
(45) Date of Patent: Dec. 28, 2021

(54) SYSTEMS AND METHODS FOR CONDITIONING TRAINING DATA TO AVOID LEARNED ABERRATIONS

(71) Applicant: Toyota Research Institute, Inc., Los Altos, CA (US)

(72) Inventors: Vitor Guizilini, Santa Clara, CA (US); Rares A. Ambrus, San Francisco, CA (US); Rui Hou, Issaquah, WA (US); Jie Li, Los Altos, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 2 days.

(21) Appl. No.: 16/828,196

(22) Filed: Mar. 24, 2020

(65) Prior Publication Data
US 2021/0090277 A1 Mar. 25, 2021

Related U.S. Application Data

(60) Provisional application No. 62/904,948, filed on Sep. 24, 2019.

(51) Int. Cl.
*G06T 7/00* (2017.01)
*G06T 7/55* (2017.01)
(Continued)

(52) U.S. Cl.
CPC ............. *G06T 7/55* (2017.01); *G06N 3/0454* (2013.01); *G06N 3/08* (2013.01); *G06T 7/20* (2013.01);
(Continued)

(58) Field of Classification Search
CPC ... G06T 7/55; G06T 7/20; G06T 2207/10016; G06T 2207/10028; G06T 2207/20081; G06N 3/0454; G06N 3/08
See application file for complete search history.

(56) References Cited

U.S. PATENT DOCUMENTS 8,472,699 B2 6/2013 Ng et al.
10,088,814 B2 * 10/2018 Wenzel .................. G06F 30/00
(Continued)

FOREIGN PATENT DOCUMENTS

WO 2011017310 A1 2/2011

OTHER PUBLICATIONS

Godard, "Digging Into Self-Supervised Depth Estimation", found at: arXiv:1806.01260v4 [cs.CV] Aug. 17, 2019.
(Continued)

*Primary Examiner* — Ping Y Hsieh
*Assistant Examiner* — Xiao Liu
(74) *Attorney, Agent, or Firm* — Christopher G. Darrow; Darrow Mustafa PC

(57) ABSTRACT

System, methods, and other embodiments described herein relate to self-supervised training for monocular depth estimation. In one embodiment, a method includes filtering disfavored images from first training data to produce second training data that is a subsampled version of the first training data. The disfavored images correspond with anomaly maps within a set of depth maps. The first depth model is trained according to the first training data and generates the depth maps from the first training data after initially being trained with the first training data. The method includes training a second depth model according to a self-supervised training process using the second training data. The method includes providing the second depth model to infer distances from monocular images.

20 Claims, 6 Drawing Sheets

(51) Int. Cl.
- G06T 7/20 (2017.01)
- G06N 3/08 (2006.01)
- G06N 3/04 (2006.01)

(52) U.S. Cl.
CPC .............. G06T 2207/10016 (2013.01); G06T 2207/10028 (2013.01); G06T 2207/20081 (2013.01)

(56) References Cited

U.S. PATENT DOCUMENTS

| | | | | |
|---|---|---|---|---|
| 2010/0104199 | A1* | 4/2010 | Zhang | G08G 1/165 382/199 |
| 2019/0139179 | A1 | 5/2019 | Wang et al. | |
| 2019/0356905 | A1* | 11/2019 | Godard | G06T 7/73 |
| 2021/0049757 | A1* | 2/2021 | Zhu | G06T 7/32 |

OTHER PUBLICATIONS

Casser et al., "Depth prediction without the sensors: Leveraging structure for unsupervised learning from monocular videos", found at: arXiv:1811.06152v1 [cs.CV] Nov. 15, 2018.
Godard et al., "Unsupervised monocular depth estimation with left-right consistency", found at: arXiv:1609.03677v3 [cs.CV] Apr. 12, 2017.
Guizilini et al., "Packnet-sfm: 3d packing for self-supervised monocular depth estimation", found at: arXiv:1905.02693v3 [cs.CV] Dec. 6, 2019.
Chen et al., "Towards Scene Understanding: Unsupervised Monocular Depth Estimation With Semantic-aware Representation"., The IEEE Conference on Computer Vision and Pattern Recognition (CVPR), 2019, pp. 2624-2632.
Ochs et al., "SDNet: Semantically Guided Depth Estimation Network", found at: arXiv:1907.10659v1 [cs.CV] Jul. 24, 2019.
Schneider et al., "Semantically Guided Depth Upsampling" Pattern Recognition: 38th German Conference, GCPR 2016, Hannover, Germany, Sep. 12-15, 2016, Proceedings (pp. 37-48).
Ummenhofer et al., "DeMoN: Depth and Motion Network for Learning Monocular Stereo", found at: arXiv:1612.02401v2 [cs.CV] Apr. 11, 2017.
Yang et al., "Every Pixel Counts: Unsupervised Geometry Learning with Holistic 3D Motion Understanding", found at: arXiv:1806.10556v2 [cs.CV] Aug. 15, 2018.
Bai et al., "Exploiting Semantic Information and Deep Matching for Optical Flow", found at: arXiv:1604.01827v2 [cs.CV] Aug. 23, 2016.
Cordts et al. "The cityscapes dataset for semantic urban scene understanding", In Proceedings of the IEEE conference an computer vision and pattern recognition, pp. 3213-3223, 2016.
Deng et al., "ImageNet: A Large-Scale Hierarchical Image Database", In Proceedings of the IEEE Conference on Computer Vision andPattern Recognition, 2009.
Eigen et al., "Depth map prediction from a single image using a multi-scale deep network", found at: arXiv:1406.2283v1 [cs.CV] Jun. 9, 2014.
Fischler et al., "Random sample consensus: A paradigm for model fitting with applications to image analysis and automated cartography", Commun. ACM, 24(6), 1981.
Fu et al., "Deep ordinal regression network for monocular depth estimation", In Proceedings of the IEEE Conference on Computer Vision and Pattern Recognition, pp. 2002-2011, 2018.
Garg et al., "Unsupervised cnn for single view depth estimation: Geometry to the rescue", found at: arXiv:1603.04992v2 [cs.CV] Jul. 29, 2016.
Geiger et al., "Vision meets robotics: The kitti dataset", The International Journal of Robotics Research, 32(11):1231-1237, 2013.
Jaderberg et al., "Spatial transformer networks", In Advances in neural information processing systems, pp. 2017-2025, 2015.
Pillai, et al., "Superdepth: Selfsupervised, super-resolved monocular depth estimation", Found at: arXiv:1810.01849, 2018.
Mahjourian et al., "Unsupervised learning of depth and ego-motion from monocular video using 3d geometric constraints", In Proceedings of the IEEE Conference on Computer Vision and Pattern Recognition, pp. 5667-5675, 2018.
Wu et al., "Group normalization", found at: arXiv:1803.08494v3 [cs.CV] Jun. 11, 2018.
Zhou et al., "Unsupervised learning of depth and ego-motion from video", In CVPR, vol. 2, p. 7, 2017.
Zou et al., "Df-net: Unsupervised joint learning of depth and flow using cross-task consistency", In European Conference on Computer Vision, 2018.
He et al., "Deep residual learning for image recognition", found at: arXiv:1512.03385v1 [cs.CV] Dec. 10, 2015.
Kendall, et al., "Multi-task learning using uncertainty to weigh losses for scene geometry and semantics", In Proceedings of the IEEE Conference on Computer Vision and Pattern Recognition, found at: arXiv:1705.07115v3 [cs.CV] Apr. 24, 2018.
Klodt et al., "Supervising the new with the old: Learning SFM from SFM", In European Conference on Computer Vision, pp. 713-728. Springer, 2018.
Lee et al., "Spigan: Privileged adversarial learning from simulation". In ICLR, 2019 (in 14 pages).
Manhardt et al., "Roi-10d: Monocular lifting of 2d detection to 6d pose and metric shape", found at: arXiv preprint arXiv:1812.02781, 2018.
Michels et al., "High speed obstacle avoidance using monocular vision and reinforcement learning", In Proceedings of the 22nd international conference on Machine learning, pp. 593-600. ACM, 2005.
Wang et al., "Learning depth from monocular videos using direct methods", In Proceedings of the IEEE Conference on Computer Vision and Pattern Recognition, pp. 2022-2030, 2018.
Wang et al., "Image quality assessment: from error visibility to structural similarity", IEEE transactions on image processing, 13(4):600-612, 2004.
Yang et al., "Deep virtual stereo odometry: Leveraging deep depth prediction for monocular direct sparse odometry", found at: arXiv:1807.02570v2 [cs.CV] Jul. 25, 2018.
Yin et al., "GeoNet: Unsupervised learning of dense depth, optical flow and camera pose", In Proceedings of the IEEE Conference on Computer Vision and Pattern Recognition (CVPR), vol. 2, 2018.
Guo et al., "Learning monocular depth by distilling cross-domain stereo networks", found at: arXiv:1808.06586v1 [cs.CV] Aug. 20, 2018.
Guney et al., "Displets: Resolving stereo ambiguities using object knowledge", In Conference on Computer Vision and Pattern Recognition (CVPR), 2015.
Kirillov et al., "Panoptic feature pyramid networks", found at: arXiv:1901.02446v2 [cs.CV] Apr. 10, 2019.
Lee at al., "Single-image depth estimation based on fourier domain analysis", In International Conference on Computer Vision and Pattern Recognition (CVPR), pp. 330-339, 2018.
Li et al., "Depth and surface normal estimation from monocular images using regression on deep features and hierarchical CRFs", In International Conference on Computer Vision and Pattern Recognition (CVPR), pp. 1119-1127, 2015.
Li et al., "Learning to fuse things and stuff", found at: arXiv:1812.01192v1 [cs.CV] Dec. 4, 2018.
Porzi et al., "Seamless scene segmentation", found at: arXiv:1905.01220v1 [cs.CV] May 3, 2019.
Qi et al., "Geometric neural network for joint depth and surface normal estimation", In International Conference on Computer Vision and Pattern Recognition (CVPR), pp. 283-291, 2018.
Su et al., "Pixeladaptive convolutional neural networks", In Proceedings of the IEEE Conference on Computer Vision and Pattern Recognition (CVPR), 2019.
Wang et al., "Image quality assessment: from error visibility to structural similarity", IEEE transactions on image processing, 2004.
Xiong et al., "Upsnet: A unified panoptic segmentation network", found at: arXiv:1901.03784v2 [cs.CV] Apr. 3, 2019.

(56) References Cited

OTHER PUBLICATIONS

Yang et al., "Unsupervised learning of geometry with edge-aware depth-normal consistency" found at arXiv:1711.03665v1 [cs.CV] Nov. 10, 2017.
Zhan et al., "Unsupervised learning of monocular depth estimation and visual odometry with deep feature reconstruction", In Proceedings of the IEEE Conference on Computer Vision and Pattern Recognition, pp. 340-349, 2018.
Lin et al., "Feature pyramid networks for object detection", found at: arXiv:1612.03144v2 [cs.CV] Apr. 19, 2017.

* cited by examiner

SYSTEMS AND METHODS FOR CONDITIONING TRAINING DATA TO AVOID LEARNED ABERRATIONS

CROSS-REFERENCE TO RELATED APPLICATIONS

This application claims benefit of U.S. Provisional Application No. 62/904,948, filed on, Sep. 24, 2019, which is herein incorporated by reference in its entirety.

TECHNICAL FIELD

The subject matter described herein relates, in general, to systems and methods for training a depth model to determine depths of a scene from a monocular image, and, more particularly, to using a trained model that exhibits learned aberrations to identify images associated with the aberrations and filter the disfavored images from subsequent training data.

BACKGROUND

Various devices that operate autonomously or that provide information about a surrounding environment use sensors that facilitate perceiving obstacles and additional aspects of the surrounding environment. For example, a robotic device may use information from the sensors to develop an awareness of the surrounding environment in order to navigate through the environment. In particular, the robotic device uses the perceived information to determine a 3-D structure of the environment and identify navigable regions. However, depending on the available onboard sensors, the robotic device may acquire a limited perspective of the environment, and, thus, encounter difficulties in distinguishing between aspects of the environment.

For example, while monocular cameras can be a cost-effective approach to acquiring information about the surroundings, the sensor data from such cameras does not explicitly include depth information. Instead, processing routines derive depth information from the monocular images. However, leveraging monocular images to perceive depth can suffer from various difficulties, including image artifacts, training (e.g., expensive or limited availability of training data), learned aberrations from embedded characteristics of the training data, and so on. As such, many difficulties associated with determining depth data persist that may result in reduced situational awareness for a device, and, thus, difficulties in navigating or performing other functions.

SUMMARY

In one embodiment, example systems, and methods relate to an improved approach to generating a training data set for training a depth model to derive depth estimates from monocular images. For example, in one arrangement, a depth system is disclosed that employs a training architecture that mitigates difficulties due to learned aberrations from the training data. In general, the present approach to training the depth model includes two separate stages, a first stage involves the straightforward training of the depth model that is self-supervised. The first stage uses training data that includes pairs of monocular images derived by combining separate frames of a monocular video. The separate frames are of a same scene in the video but are from different points in time and generally from at least slightly different perspectives since a camera that acquires the frames is in motion through the scene.

The first stage of training executes the depth model over the training data while iteratively updating the depth model according to a loss function, such as an appearance-based loss function (e.g., photometric loss). As noted, the first stage training can result in the depth model learning aberrations that may exist in the training data. For example, various instances within the monocular video may include objects moving at the same speed as the camera. When the camera is mounted to a vehicle, other vehicles commonly move at the same speed, thereby generating frames within the monocular video including the noted configuration. Accordingly, because the appearance-based loss lacks awareness of scale in relation to the image, the depth model learns that the areas associated with the objects moving at the same speed have an infinite depth similar to a point on the horizon. Thus, the depth model can subsequently predict depths of similar objects as areas of infinite depth within the image.

Accordingly, the depth system implements a second stage of training to resolve the difficulties with the infinite depth problem. Initially, the depth system executes the trained depth model over the training data to generate separate depth maps for the separate images/frames. The depth system can then analyze the depth maps to identify which maps are anomalous and include depth estimates indicative of the aberrations from the infinite depth problem. According to this correspondence, the depth system identifies images associated with causing the depth model to learn aberrations associated with the infinite depth problem. Consequently, the depth system, in one approach, filters the disfavored images from the training data to produce a second set of training data that is a subsampled version of the original training data. The second set of training data does not include images that cause the depth model to learn aberrations associated with the infinite depth problem.

The depth system then uses the revised training data in the second stage to retrain the depth model or newly train a second depth model. In either case, the model that the depth system is training receives the benefits of the training data not including the disfavored images, and thereby avoids difficulties associated with the model learning the aberrations. In this way, the depth systems improves the training of the depth model to avoid difficulties with the infinite depth problem.

In one embodiment, a depth system for self-supervised training for monocular depth estimation is disclosed. The depth system includes one or more processors and a memory communicably coupled to the one or more processors. The memory stores a training module including instructions that when executed by the one or more processors cause the one or more processors to filter one or more disfavored images from first training data to produce second training data that is a subsampled version of the first training data. The disfavored images correspond with anomaly maps within a set of depth maps. The first depth model is trained according to the first training data and generates the depth maps from the first training data after initially being trained with the first training data. The training module includes instructions to train a second depth model according to a self-supervised training process using the second training data. The memory stores a network module including instructions that when executed by the one or more processors cause the one or more processors to provide the second depth model to infer distances from monocular images.

In one embodiment, a non-transitory computer-readable medium for self-supervised training for monocular depth estimation and including instructions that, when executed by one or more processors, cause the one or more processors to perform various functions is disclosed. The instructions include instructions to filter disfavored images from first training data to produce second training data that is a subsampled version of the first training data, wherein the disfavored images correspond with anomaly maps within a set of depth maps, wherein the first depth model is trained according to the first training data and generates the depth maps from the first training data after initially being trained with the first training data. The instructions include instructions to train a second depth model according to a self-supervised training process using the second training data. The instructions include instructions to provide the second depth model to infer distances from monocular images.

In one embodiment, a method for self-supervised training for monocular depth estimation is disclosed. In one embodiment, the method includes filtering disfavored images from first training data to produce second training data that is a subsampled version of the first training data. The disfavored images correspond with anomaly maps within a set of depth maps. The first depth model is trained according to the first training data and generates the depth maps from the first training data after initially being trained with the first training data. The method includes training a second depth model according to a self-supervised training process using the second training data. The method includes providing the second depth model to infer distances from monocular images.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
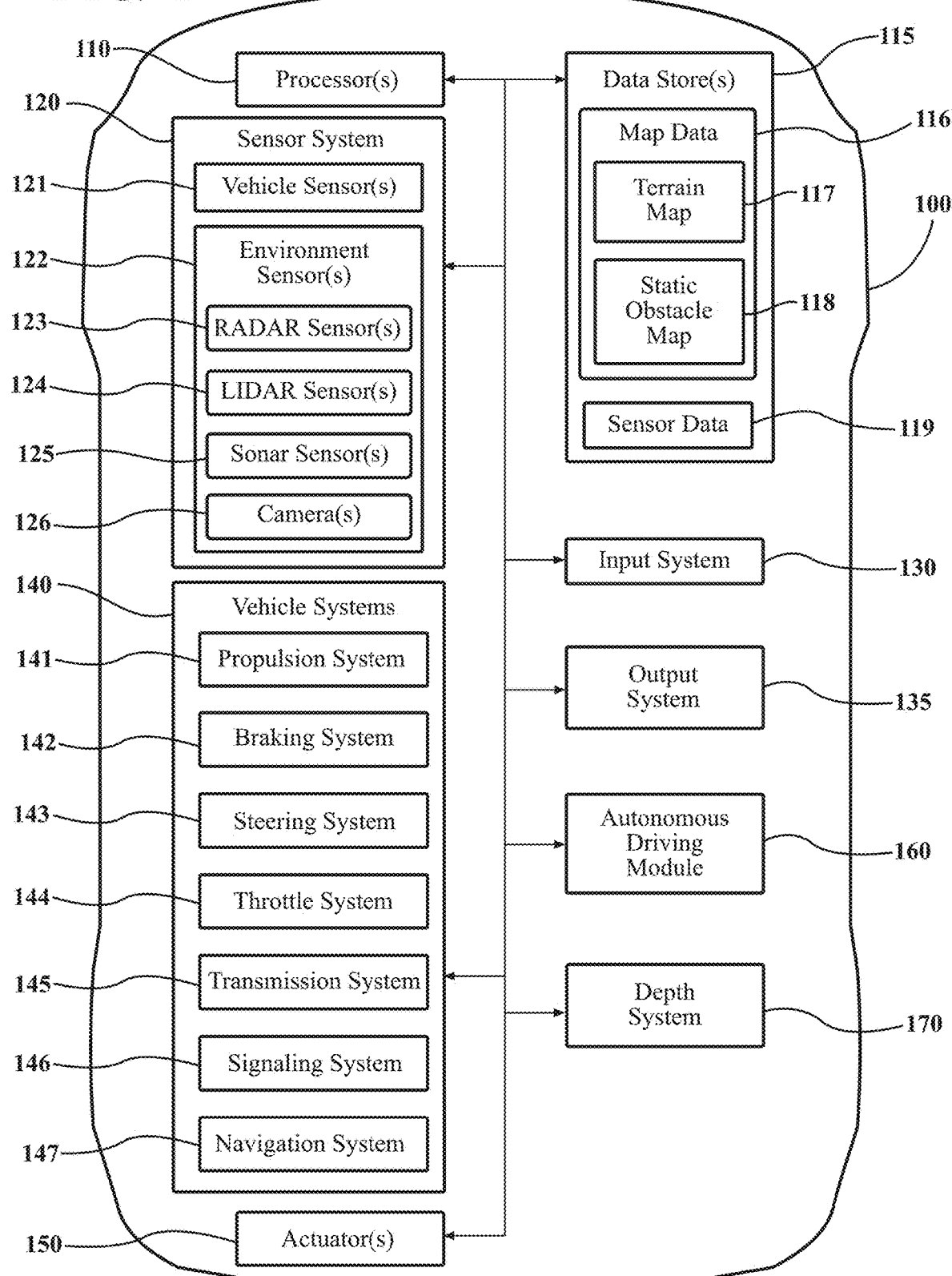
FIG. 1 illustrates one embodiment of a vehicle within which systems and methods disclosed herein may be implemented.

Systems, methods, and other embodiments associated with an improved approach to training a model to derive depth estimates from monocular images are disclosed herein. As previously noted, perceiving aspects of the surrounding environment can represent different challenges depending on which sensors a device employs to support the endeavor. In particular, difficulties with using monocular cameras to perceive depths in the surrounding environment can complicate the use of such sensors. One such difficulty is the infinite depth problem that manifests as learned aberrations of a model in which the model perceives certain objects as having an infinite depth similar to a point on the horizon or in the sky. This difficulty can arise when the original training data from which the model was trained includes instances of objects moving at the same speed as the camera that generated the monocular video for the train data. Thus, when the camera is mounted to a vehicle, other vehicles commonly move at the same speed, thereby generating frames within the monocular video, including objects that do not appear to move in relation to the camera. Accordingly, because the depth system trains the model using an appearance-based loss that lacks awareness of scale in relation to the image, the depth model learns that the areas associated with the objects moving at the same speed have an infinite depth similar to a point on the horizon. Thus, the depth model may subsequently predict depths of similar objects as areas of infinite depth within an image.

Therefore, in one embodiment, a depth system is disclosed that employs a training architecture to support training a depth model to derive depth estimates from monocular images while avoiding difficulties with infinite depth. For example, the present approach to training the depth model includes two separate stages. The first stage involves an initial training of the depth model that is self-supervised. The first stage uses training data that includes pairs of monocular images derived by combining separate frames of a monocular video. The separate frames are of a same scene in the video but are from different points in time and generally from at least slightly different perspectives since a camera that acquires the frames is in motion through the scene. The first stage of training executes the depth model over the training data while iteratively updating the depth model according to a loss function that assesses an accuracy of results from the depth model. The first stage training can result in the depth model learning aberrations that may exist in the training data due to the loss function being, for example, appearance-based and lacking awareness of scale.

Accordingly, the depth system implements a second stage of training to refine the training data and resolve the noted difficulties. The depth system uses the trained depth model as a mechanism to identify images in the training data that may be associated with causing the depth model to learn the aberrations. Thus, in one approach, the depth system executes the trained depth model over the training data to generate separate depth maps for the images. The depth system then analyzes the depth maps to identify which maps include aberrations from objects having depth estimates of infinite depth. The depth system identifies images correlating with the depth maps exhibiting the aberrations and filters the disfavored images from the training data. As a result, the depth system produces a second set of training data that is a subsampled version of the original training data. Thus, the second set of training data does not include images, or at least includes fewer images, that cause the depth model to learn aberrations associated with the infinite depth problem.

The revised training data permits the depth model to execute a second stage of training to either retrain the depth model or newly train a second depth model with the benefit of the training data not including the disfavored images, and thereby avoiding difficulties associated with the model learning the aberrations from the disfavored images. A resulting model from the second stage of training shows improved resiliency against the infinite depth problem since the model does not learn about the root features of the problem. In this way, the depth systems improves the estimation of depths by the depth model that avoids difficulties with the infinite depth problem.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any electronic device that may be related to transportation, entertainment, communication, etc. and that, for example, perceives an environment according to monocular images. In yet further embodiments, the vehicle 100 may instead be a statically mounted device, an embedded device, or another device that uses monocular images to derive depth information about a scene or that separately trains the depth model for deployment in such a device.

In any case, the vehicle 100, as described herein, also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-6 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a depth system 170 that functions to train and implement a model to process monocular images in order to provide depth estimates for an environment (e.g., objects, surfaces, etc.) depicted therein. Moreover, while depicted as a standalone component, in one or more embodiments, the depth system 170 is integrated with the autonomous driving module 160, the camera 126, or another component of the vehicle 100. The noted functions and methods will become more apparent with a further discussion of the figures.

Figure 2:
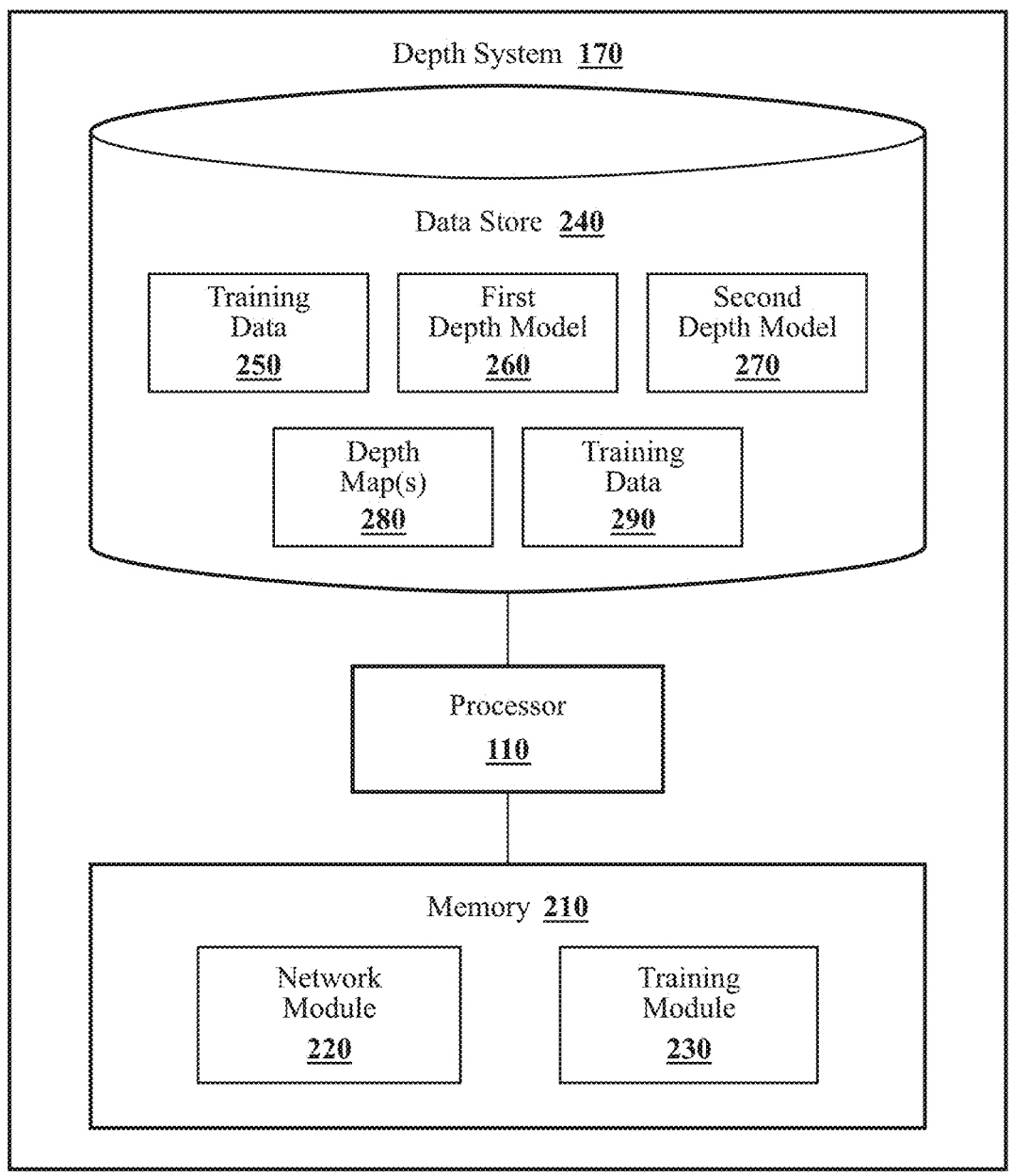
FIG. 2 illustrates one embodiment of a depth system that is associated with training a depth model.

With reference to FIG. 2, one embodiment of the depth system 170 is further illustrated. The depth system 170 is shown as including a processor 110. Accordingly, the processor 110 may be a part of the depth system 170 or the depth system 170 may access the processor 110 through a data bus or another communication path. In one or more embodiments, the processor 110 is an application-specific integrated circuit (ASIC) that is configured to implement functions associated with a network module 220 and a training module 230. In general, the processor 110 is an electronic processor such as a microprocessor that is capable of performing various functions as described herein. While illustrated as a local resource, in various embodiments, the processor 110 may be a cloud-based resource that is remote from the system 170. In one embodiment, the depth system 170 includes a memory 210 that stores the network module 220 and the training module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein.

Furthermore, in one embodiment, the depth system 170 includes a data store 240. The data store 240 is, in one embodiment, an electronic data structure such as a database that is stored in the memory 210 or another memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes training data 250, a first depth model 260, a second depth model 270, depth maps 280, and training data 290, along with, for example, other information that is used by the modules 220 and 230.

The training data 250 generally includes one or more monocular videos from a moving camera and that are comprised of a plurality of frames in the form of monocular images. As described herein, a monocular image is, for example, generated by a camera (e.g., camera 126) that, for example, uses a single light-capturing mechanism to generate an image. Thus, a monocular video is similarly comprised of a series of such images. The monocular images encompass a field-of-view (FOV) about the vehicle 100 or another moving source that captures the video of at least a portion of the surrounding environment. That is, the monocular image is, in one approach, generally limited to a subregion of the surrounding environment. As such, the image may be of a forward-facing (i.e., the direction of travel) 60, 90, 120-degree FOV, a rear/side facing FOV, or some other subregion as defined by the characteristics of the camera 126.

In any case, the monocular image itself includes visual data of the FOV that is encoded according to a video standard (e.g., codec) associated with the camera 126. In general, characteristics of the camera 126 and the video standard in which the camera 126 produces the video defines a format of the monocular image. Thus, while the particular characteristics can vary according to different implementations, in general, the image has a defined resolution (i.e., height and width in pixels) and format. Thus, for example, the monocular image is generally an RGB visible light image. In further aspects, the monocular image can be an infrared image associated with a corresponding infrared camera, a black/white image, or another suitable format as may be desired. Whichever format that the depth system 170 implements, the image is a monocular image in that there is no explicit additional modality indicating depth nor any explicit corresponding image from another camera from which the depth can be derived (i.e., no stereo camera pair). In contrast to a stereo image that may integrate left and right images from separate cameras mounted side-by-side to provide an additional depth channel, the monocular image does not include explicit depth information such as disparity maps derived from comparing the stereo images pixel-by-pixel. Instead, the monocular image implicitly provides depth information in the relationships of perspective and size of elements depicted therein from which the first depth model 260 derives the depth map(s) 280.

Moreover, the monocular video may include observations of many different scenes. That is, as the camera 126 or another original source camera of the video progresses through an environment, perspectives of objects and features in the environment change, and the depicted objects/features themselves also change, thereby depicting separate scenes (i.e., particular combinations of objects/features). Thus, the depth system 170 may extract particular training pairs of monocular images from the monocular video for training. In particular, the depth system 170 generates the pairs from the video so that the pairs of images are of the same scene. As should be appreciated, the video includes a series of monocular images that are taken in succession according to a configuration of the camera 126 as the camera is in motion. Thus, the camera 126 may generate the images (also referred to herein as frames) of the video at regular intervals, such as every 0.033 s. That is, a shutter of the camera operates at a particular rate (i.e., frames-per-second (fps) configuration), which may be, for example, 24 fps, 30 fps, 60 fps, etc.

For purposes of the present discussion, the fps is presumed to be 30 fps. However, it should be appreciated that the fps may vary according to a particular configuration. Moreover, the depth system 170 need not generate the pairs from successive ones (i.e., adjacent) of the frames, but instead can generally pair separate images of the same scene that are not successive as training images. Thus, in one approach, the depth system 170 pairs every other image depending on the fps. In a further approach, the depth system pairs every fifth image as a training pair. The greater the timing difference in the video between the pairs, the more pronounced a difference in camera position; however, this may also result in fewer shared features/objects between the images. As such, as previously noted, the pairs of training images are of a same scene and are generally constrained, in one or more embodiments, to be within a defined number of frames (e.g., 5 or fewer) to ensure correspondence of an observed scene between the monocular training images. In any case, the pairs of training images generally have the attributes of being monocular images from a monocular video that are separated by some interval of time (e.g., 0.06 s) such that a perspective of the camera changes between the pair of training images as a result of motion of the camera through the environment while generating the video.

With further reference to FIG. 2, the depth system 170 further includes the first depth model 260, which produces the depth map(s) 280. The system 170 may further include a second depth model 270, and a pose model (not illustrated). The pose model produces transformations that are used for self-supervised training of a depth model. In general, the first depth model 260, the second depth model 270, and the pose model are, in one embodiment, machine learning algorithms. However, the particular form of the respective models may be distinct. That is, for example, the first depth model 260 and the second depth model 270 are machine learning algorithms that accept an electronic input in the form of a single monocular image and produce the depth map 280 as a result of processing the monocular image. The exact form of the first depth model 260 and the second model 270 may vary according to the implementation but is generally a convolutional type of neural network.

Moreover, while the first depth model 260 and the second depth model 270 are discussed as being distinct, in one approach, the first depth model 260 and the second depth model 270 are the same model represented as separate instances of training. In other words, the depth system 170 may initially train the first depth model 260 and then subsequently retrain the model 260 after resetting hyperparameters to produce the model 270. In further aspects, the model 270 may be a separate instance of the model 260 or the model 270 may have a separate architecture (i.e., different configuration of layers or types of layers).

Figure 3:
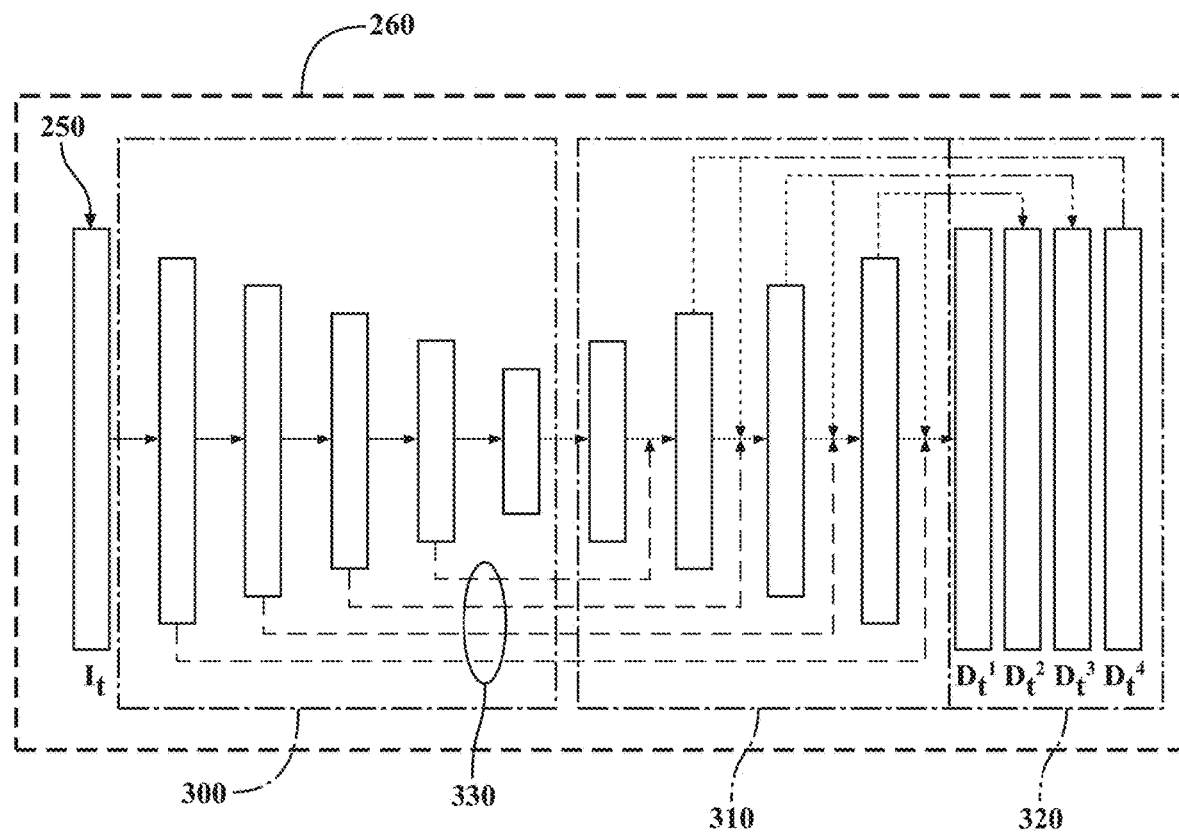
FIG. 3 is a diagram illustrating one embodiment of a depth model.
Figure 3:
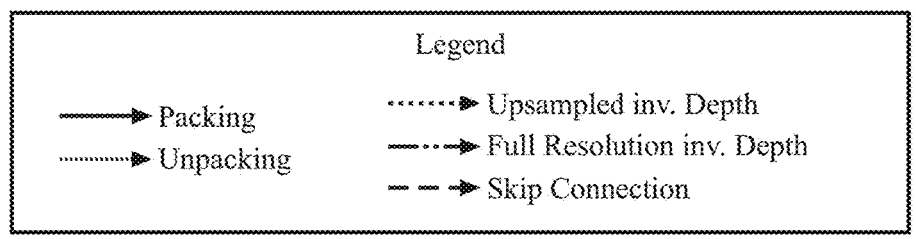
Figure 4:
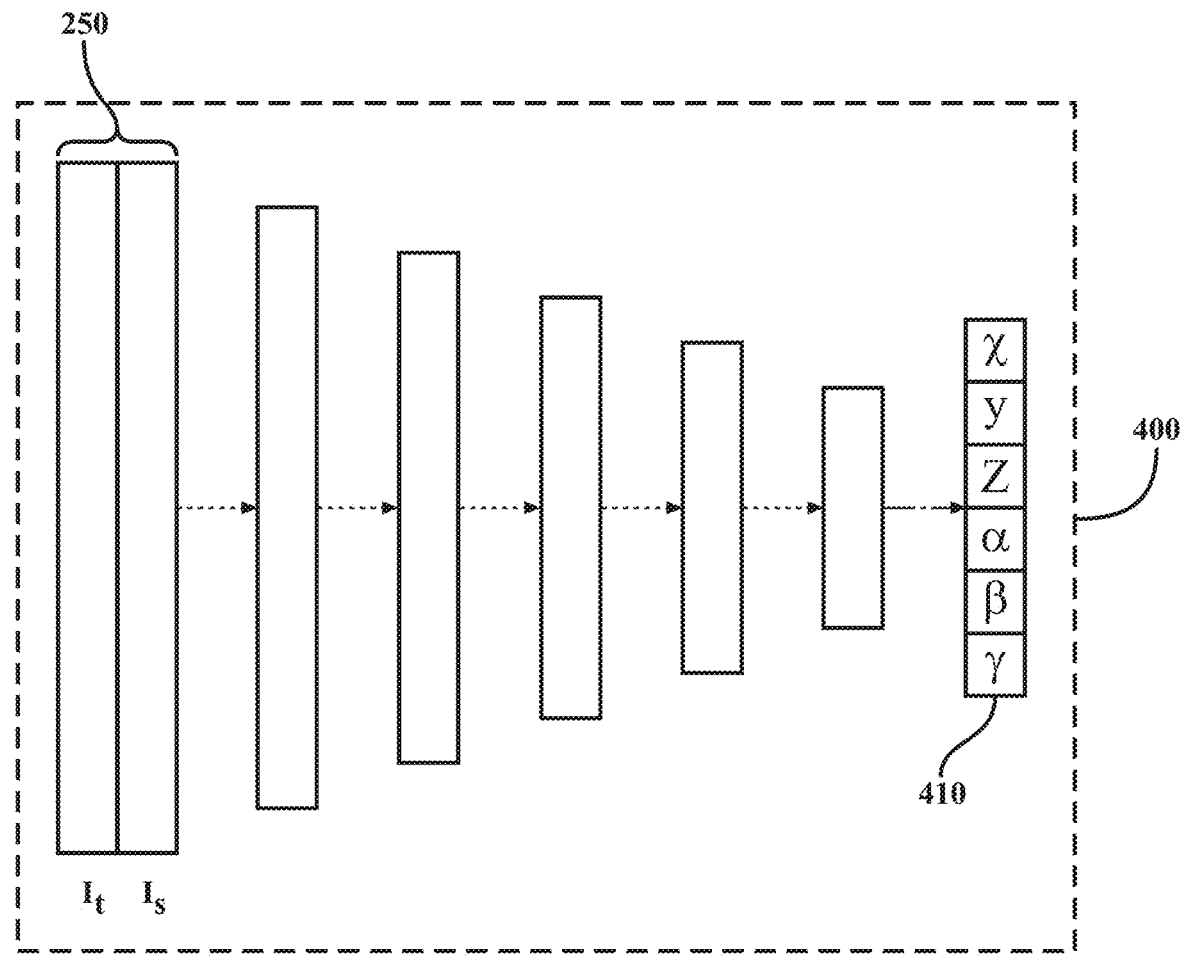
FIG. 4 is a diagram illustrating one embodiment of a pose model that may be used in training a depth model according to a self-supervised training process.

As an additional explanation of one embodiment of the first depth model 260 and the pose model, consider FIG. 3 and FIG. 4. FIG. 3 illustrates a detailed view of one implementation of the first depth model 260. It should be appreciated that while one specific example of the first depth model 260 is discussed, the noted example is not intended to be limiting but is one example that is presented for purposes of discussion. In various embodiments, the first depth model 260 may be implemented according to different network architectures than the example illustrated in FIG. 3. As shown in FIG. 3, the first depth model 260 has an encoder/decoder architecture. The encoder/decoder architecture as shown in the example embodiment generally includes a set of neural network layers, including convolutional components 300 (e.g., 2D and/or 3D convolutional layers forming an encoder) that flow into deconvolutional components 310 (e.g., 2D and/or 3D deconvolutional layers forming a decoder). In one approach, the encoder accepts a monocular image, such as a monocular image from the training data 250, as an electronic input and processes the image to extract depth features therefrom. The depth features are, in general, aspects of the image that are indicative of spatial information that the image intrinsically encodes. As such, encoding layers that form the encoder 300 function to, for example, fold (i.e., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original monocular image.

Accordingly, in one embodiment, the encoder 300 is comprised of multiple encoding layers formed from a combination of two-dimensional (2D) convolutional layers, packing blocks, and residual blocks. Moreover, the separate encoding layers generate outputs in the form of encoded feature maps (also referred to as tensors), which the encoding layers provide to subsequent layers in the first depth model 260. As such, the encoder 300 includes a variety of separate layers that operate on the monocular image, and subsequently on derived/intermediate feature maps that convert the visual information of the monocular image into embedded state information in the form of encoded features of different channels.

In one embodiment, the decoder 310 unfolds (i.e., adapt dimensions of the tensor to extract the features) the previously encoded spatial information in order to derive the depth map 280 according to learned correlations associated with the encoded features. That is, the decoding layers generally function to up-sample, through sub-pixel convolutions and other mechanisms, the previously encoded features into the depth map 280, which may be provided at different resolutions 320. In one embodiment, the decoding layers comprise unpacking blocks, two-dimensional convolutional layers, and inverse depth layers that function as output layers for different scales of the feature map. The depth map 280 is, in one embodiment, a data structure corresponding to the input image that indicates distances/depths to objects/features represented therein. Additionally, in one embodiment, the depth map 280 is a tensor with separate data values indicating depths for corresponding locations in the image on a per-pixel basis.

Moreover, the first depth model 260 can further include skip connections 330 for providing residual information between the encoder 300 and the decoder 310 to facilitate memory of higher-level features between the separate components. While a particular encoder/decoder architecture is discussed, as previously noted, the first depth model 260 and the second depth model 270, in various approaches, may take different forms than the example disclosed herein and generally function to process the monocular images and provide depth maps that are per-pixel estimates about distances of objects/features depicted in the images.

Continuing to FIG. 4, one embodiment of a pose model 400 is illustrated. The pose model 400 provides support for training a depth model and accepts two monocular images (i.e., a training pair) from the training data 250 of the same scene as an electronic input and processes the monocular images ($I_t$, $I_s$) to produce estimates of camera ego-motion between the two images. The estimates of ego motion relate to the fact that the monocular video from which the images are derived generally involves movement of the camera through the scene. Thus, the pose model 400 produces the estimates in the form of a 6 degree-of-freedom (DOF) rigid-body transformation 410. The pose model 400 itself is, in one example, a convolutional neural network (CNN) or another machine learning model that is differentiable and performs dimensional reduction of the input images to produce the transformation. In one approach, the pose model includes 7 stride-2 convolutions, a 1×1 convolution with 6*(N−1) output channels corresponding to 3 Euler angles and a 3-D translation for one of the images (source image $I_s$), and global average pooling to aggregate predictions at all spatial locations. The transformation 410 is, in one embodiment, a 6 DOF rigid-body transformation belonging to the special Euclidean group SE(3) that represents the change in pose between the pair of images provided as inputs to the pose model 400. In any case, the pose model 400 performs a dimensional reduction of the monocular images to derive the transformation 410 therefrom.

As an additional note, while the models are discussed as discrete units separate from the network module 220, the first depth model 260, the second depth model 270, and the pose model are, in one or more embodiments, generally integrated with the network module 220. That is, the network module 220 functions to execute various processes of the models and use various data structures of the models in support of such execution. Accordingly, in one embodiment, the network module 220 includes instructions that function to control the processor 110 to generate the depth map 280 using the first depth model 260 and generate the transformation using the pose model as disclosed.

Figure 5:
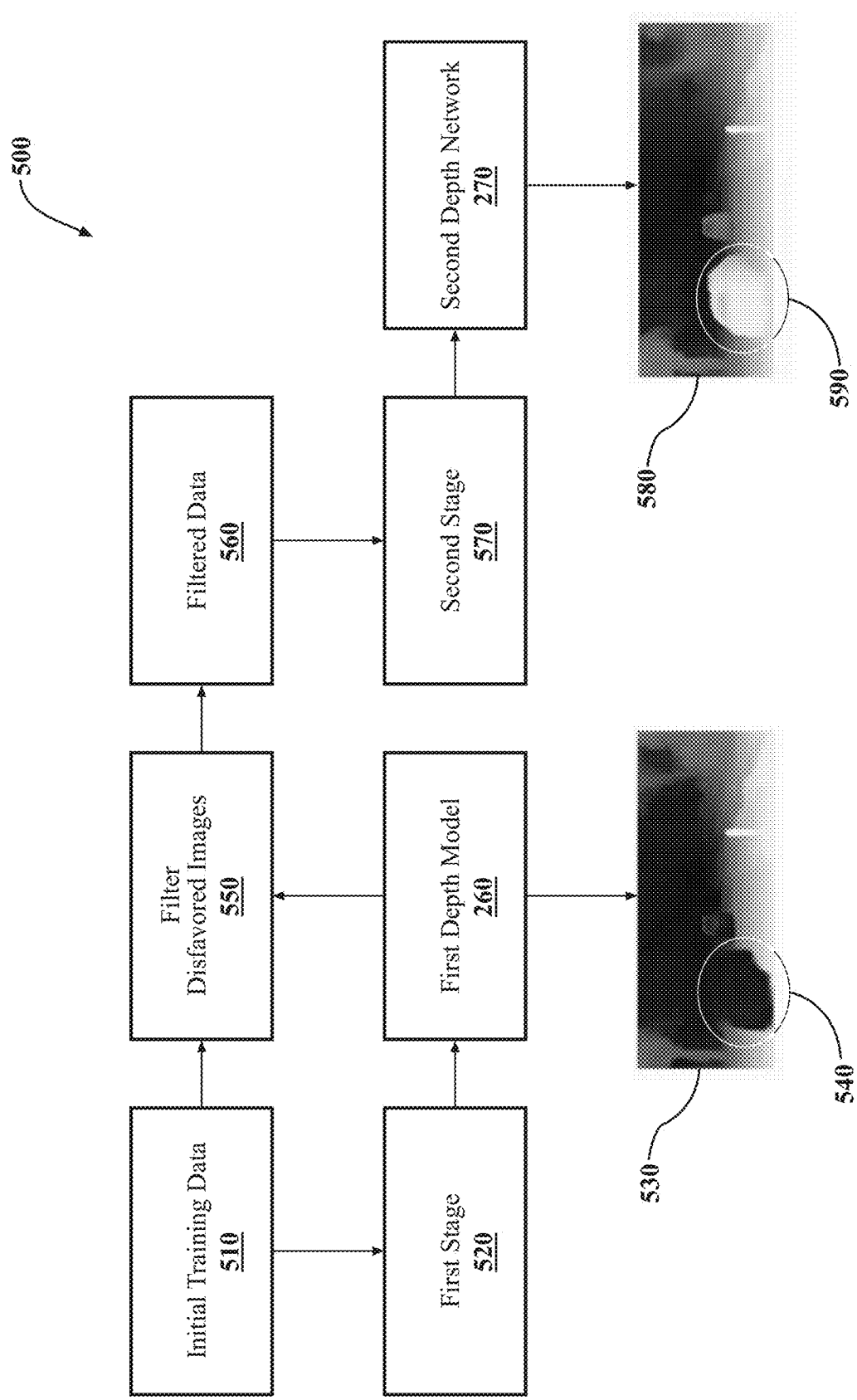
FIG. 5 illustrates one embodiment of a two-stage training architecture for a depth model.

As a further explanation of the training architecture 500 formed in relation to the first depth model 260, the second depth model 270, and the pose model, consider FIG. 5 in relation to components previously described in relation to FIG. 2. FIG. 5 illustrates one embodiment of a training architecture 500 that denotes various relationships between the first depth model 260, and the second depth model 270, and inputs/outputs thereof. As shown in FIG. 5, initial training data 510, which generally corresponds to the training data 250, includes pairs of images ($I_t$, $I_s$) derived from a monocular video.

As an initial note about training using the illustrated architecture 500, the training module 230 generally includes instructions that function to control the processor 110 to execute various actions associated with training the first depth model 260 and the second depth model 270. For example, the training module 230, in one embodiment, controls the training according to a two-stage process, as shown. In general, at the first stage 520, the training module 230 controls the depth model 260 to process the initial training data 510 and updates the depth model 260 according to a self-supervised training process.

It should be understood that the self-supervised training discussed herein generally involves synthesizing an additional image that corresponds to an image processed by the model 260 when training by using an associated transformation from the pose model and the depth map produced from the model 260. The training module uses the synthesized image in comparison to an original image from the training pair to generate a self-supervised loss that is generally appearance-based (e.g., photometric loss). As a result of the first stage 520, the first depth model 260 is trained. Thus, the training module 230 can then use the first depth model 260 to process the initial training data 510 to produce depth maps, such as depth map 530. As shown, the depth map 530 includes an area 540 that is indicated as having infinite-depth similar to regions in the map 530 such as the horizon/sky. However, the area 540 generally corresponds to a vehicle that was moving in concert with the camera that captured the image. Thus, because the initial training data 510 indiscriminately includes images with this characteristic, the first depth model 260 learned to identify areas such as area 540 as having infinite depth, which is inaccurate.

Thus, the training module 230 uses the depth map 530, and other depth maps from the first depth model 260 processing the initial training data 510, to filter disfavored images, at 550, from the initial training data 510. Because the training module 230 can analyze depth maps produced from the model 260 to identify which of the depth maps include aberrations associated with the infinite depth problem, the training module 230 uses the correlation of aberrant depth maps with the disfavored images to filter the disfavored images from the training data 510, thereby producing the filtered data 560. The filtered data 560, which generally corresponds to the second training data 290, includes fewer images, but avoids the disfavored images causing aberrations in the learned model.

The training module 230 then trains the second depth network 270 using the filtered training data 560 (i.e., training data 290) according to a self-supervised training process, as previously described. As a result of training the second depth network 270 with the filtered data 560, the second depth network 270 does not learn the aberrations as in the instance of the first depth model 260. By way of comparison, consider the depth map 530 and the depth map 580. The first depth model 260 and the second depth model 270 process the same monocular image but produce distinct depth maps 530 and 580. Upon further inspection of the depth maps 530 and 580, the area 540 in the depth map 530 exhibits infinite depth, whereas corresponding region 590 accurately depicts depths of the vehicle without exhibiting difficulties with infinite depth. Thus, the two-stage training process functions to improve the estimation of depths.

As an additional note, the network module 220 generally includes instructions that function to control the processor 110 to execute various actions associated with the first depth model 260, the second depth model 270, and the pose model. For example, in one embodiment, the network module 220 functions to process the initial training data 510 using the first depth model 260 to produce the depth maps 280 for training. Similarly, the network module 220 uses the second depth model 270, and the pose model in combination with relevant inputs (e.g., second training data 290, training image pairs) to perform tasks associated with the respective models. Moreover, the network module 220, in one approach, executes the respective models, such as model 270 and the pose model, or model 260 and the pose model, in concert (e.g., in parallel) for purposes of training, and at the direction of the training module 230. Thus, the network module 220 generally functions to execute the models, while the training module 230 functions to perform the explicit training processes such as generating the loss values and updating the models.

In regards to the individual training processes associated with the first stage 520 and the second stage 570, the network module 220 executes the respective models for purposes of training at the direction of the training module 230, and the training module 230 generates a synthesized image for each separate iteration. In one embodiment, the synthesized image is, for example, a synthesized version of a second image of a training pair according to the depth map and the transformation for a particular iteration. That is, the process of self-supervised training in the structure from motion (SfM) context involves synthesizing a different image from the model input image that is of the same scene from a different camera pose. The training module 230 generates the synthesized image, in one embodiment, using a machine learning algorithm such as a generative neural network (e.g., encoder/decoder architecture, a generative adversarial network (GAN), an autoencoder, etc.), a convolutional neural network (CNN), or another suitable architecture that accepts the depth map and the transformation for a training iteration as input and produces the synthesized image as output.

From this synthesized image, the training module 230 can generate a loss. Thus, in one approach, the training module 230 formulates the generation of the depth map as a photometric error minimization across the training image pair. The training module 230 can then compare the synthesized image and the original image to determine the loss, which is embodied as, for example, the photometric loss. This loss characterizes an accuracy of the depth model that is being trained in producing the depth map 280. Thus, the training module 230 can then use the calculated loss to adjust parameters of the depth model. Additionally, the training module 230 uses the photometric loss in combination with an additional loss (e.g., velocity supervision loss) to generate a pose loss for training the pose model in combination.

As a further explanation of one approach to training consider that in a structure from motion (SfM) context, the training module 230 is generally configured with a goal of (i) a monocular depth model $f_D$: I→D (e.g., depth model 260/270), that predicts depth $\hat{D}=f_D(I(p))$ for every pixel p in the target image $I_t$; and (ii) a monocular ego-motion estimator $f_x$:($I_t,I_s$) (e.g., pose model) that predicts the set of 6-DoF rigid-body transformations for all s∈S given by $$x_{t \to s} = \begin{pmatrix} R & t \\ 0 & 1 \end{pmatrix} \in SE,$$ (3)

between the target image $I_t$ and the set of temporal context source images $I_s \in I_S$. As a point of implementation, in one or more embodiments, the training module 230 uses frames $I_{t-1}$ and $I_{t+1}$ as source images, although a larger context, as previously noted, is possible.

The training module 230 implements the training objective using an appearance matching $\mathcal{L}_p$ between the target image $I_t$ and the synthesized image $I_{s \to t}$ (also annotated as $\hat{I}_t$) and a depth smoothness term $\mathcal{L}_s$.

$$\mathcal{L}(I_t,\hat{I}_t) = \mathcal{L}_p(I_t,\hat{I}_t) + \lambda_1 \mathcal{L}_s(\hat{D})$$ (1)

$\lambda_1$ represents a weight for adjusting the loss terms in eq (1). $\mathcal{L}_p$ represents appearance matching loss and is implemented according to, in one embodiment, a pixel-level similarity between the target image $I_t$ and the synthesized image $\hat{I}_t$ using a structural similarity (SSIM) term combined with an L1 pixel-wise loss term inducing an overall photometric loss, as shown in equation (2).

$$\mathcal{L}_p(I_t, \hat{I}_t) = \alpha \frac{1 - SSIM(I_t, \hat{I}_t)}{2} + (1-\alpha)\|I_t - \hat{I}_t\|$$ (2)

$\mathcal{L}_s$ represents depth smoothness loss and is implemented to regularize the depth in textureless low-image gradient regions, as shown in equation (3). The smoothness loss is an edge-aware term that is weighted for separate pyramid levels starting from 1 and decaying by a factor of two for the separate scales.

$$\mathcal{L}_s(\hat{D}_t) = |\delta_x \hat{D}_t|e^{-|\delta_x I_t|} + |\delta_y \hat{D}_t|e^{-|\delta_y I_t|}$$ (3)

The loss may also incorporate further aspects, including auto-masking, minimum reprojection error, and inverse depth map upsampling. In general, auto-masking mitigates the impact of static pixels by removing pixels with unchanged appearances between frames, while minimum reprojection loss increases robustness to dynamic objects, and inverse depth map upsampling removes texture-copy artifacts and holes in low-texture regions.

Thus, the training module 230, in one approach, calculates the appearance-based loss according to the above to include the photometric loss, and other terms for the self-supervised training. Through this training, the models develop a learned prior of the monocular images as embodied by the internal parameters of the models from the training on the image pairs in the training data 250/290. In general, the model develops the learned understanding about how depth relates to various aspects of an image according to, for example, size, perspective, and so on. However, after the first stage of training, the first depth model 260 still lacks awareness of a metrically accurate scale and, as such, may experience difficulties with the infinite depth problem as previously outlined. Consequently, the training module 230 controls the network module 220 to execute the second stage with the revised set of training data to overcome the noted difficulties.

Figure 6:
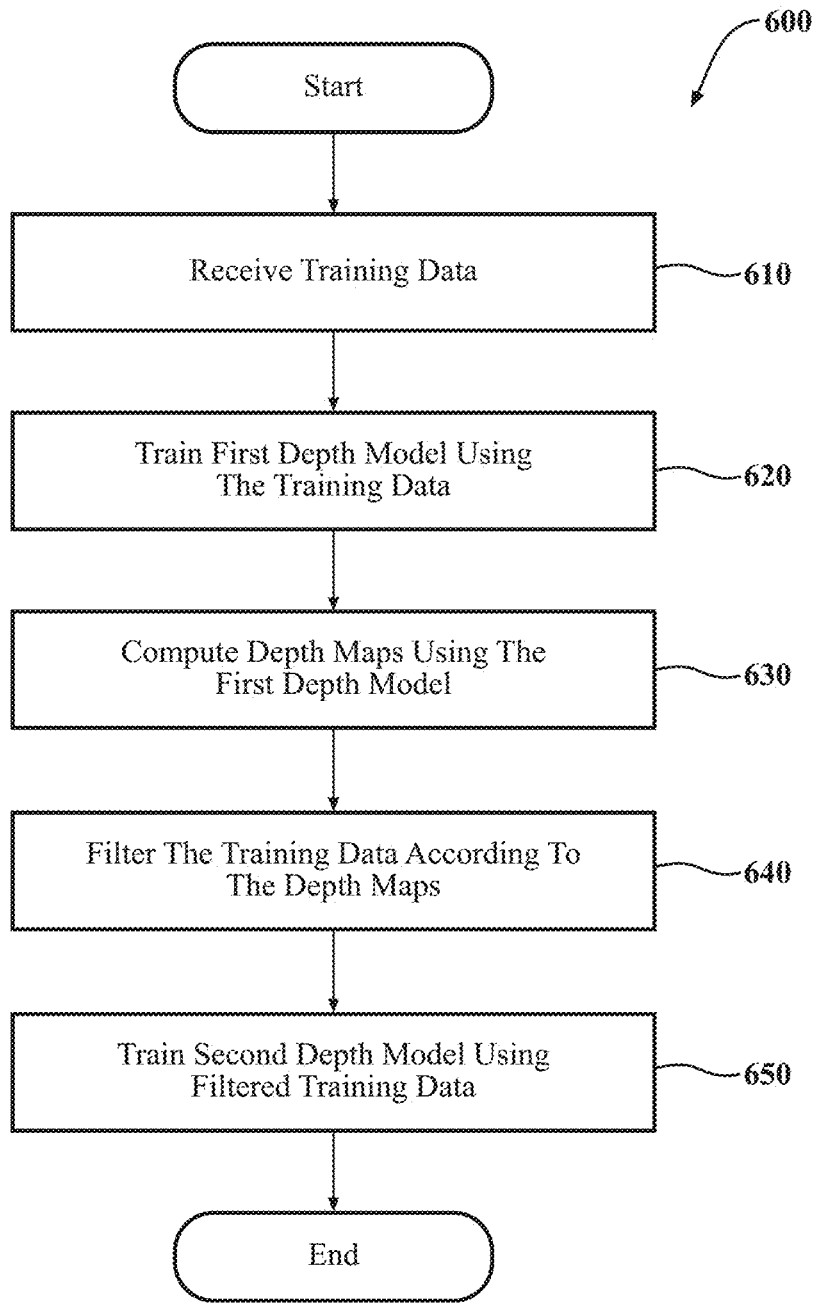
FIG. 6 is a flowchart illustrating one embodiment of a method for training a depth model in combination with a pose model over images from a monocular video.

Additional aspects of training a depth model according to a two-stage process will be discussed in relation to FIG. 6. FIG. 6 illustrates a flowchart of a method 600 that is associated with training of a depth model for monocular depth estimation. Method 600 will be discussed from the perspective of the depth system 170. While method 600 is discussed in combination with the depth system 170, it should be appreciated that the method 600 is not limited to being implemented within the depth system 170 but is instead one example of a system that may implement the method 600.

At 610, the training module 230 receives the training data 250, including multiple images derived from a monocular video and that have been formed into pairs of images. In one embodiment, the training module 230 acquires the training images locally from co-located systems with the depth system 170 (e.g., the camera 126) in an active manner, while in further embodiments, the training module 230 may acquire the training images through a communication link with a remote system or from a repository of such information as included in the data store 240. Thus, while the depth system 170 can be implemented within a particular device that is, for example, actively navigating an environment, the depth system 170 may also function as a cloud-based computing service to train the first depth model 260 and/or to analyze monocular images for depth information, and thus may receive the training data 250 from separate sources.

As previously described, the monocular video from which the training images are derived may have different characteristics according to different implementations but is generally a single monocular video (i.e., from a camera having a single imaging device) that does not include explicit depth information. Moreover, when functioning in a capacity separate from training, the depth system 170 generally accepts individual monocular images that may or may not be from a video source and that generally do not include explicit depth data.

At 620, the training module 230 causes the network module 220 to execute the first depth model 260 in order to train the first depth model 260 according to the self-supervised training process. The network module 220 iteratively executes the first depth model 260 over separates pairs of images in the first training data 250 in order to train the model 260 to produce depth estimates from monocular images. As part of training the model 260, at 620, the training module 230 may perform additional functions such as synthesizing images, comparing images, calculating losses according to one or more defined functions, determining transformations using the pose model, updating weights within the first depth model 260, updating weights within the pose model, and so on. As a result of training the first depth model 260, the first depth model 260 learns how to infer depth from an input of a monocular image alone without any explicit depth data.

At 630, the training module 230 causes the network module 220 to execute the first depth model 260 over images in the training data 250 to produce corresponding depth maps 280. The process performed at 630 is not a training process for the model 260. Instead, the model 260 is producing the depth maps 280 according to aspects learned during the iterative execution at 620. Accordingly, the depth maps 280 represent the understanding of the depth model 260 in relation to features of the images in the training data 250. The depth maps 280 produced from this aspect of the process function as a point of comparison for subsequent identification of the images associated with the infinite depth problem.

At 640, the training module 230 filters disfavored images from the first training data 250 to produce second training data 290 that is a subsampled version of the first training data 250. The disfavored images generally correspond with "anomaly maps" within the depth maps 280 from block 630. The anomaly maps represent depth maps exhibiting anomalous discontinuities corresponding to regions of disproportionate depths. As such, in one embodiment, the training module 230 analyzes the depth maps 280 for the anomaly maps by analyzing points below a ground plane within individual maps to identify points that exhibit surface normals directed upwards within a defined threshold.

For example, in one approach, the training module 230 checks separate points within the depth maps 280 that are below camera level (i.e., $z<0$) and exhibit surface normals point upwards up to the defined threshold (e.g., a dot product>0.95). These conditions are met when dynamic objects moving on the ground plane exhibit the finite depth problem, since the associated 3D reconstruction will pass through the ground to create the perceived holes (infinite depth aberrations) in the predicted depth maps 280. In any case, the resulting filtered training data 290 is without characteristics that induce learning the infinite depth aberrations.

At 650, the training module 230 causes the network module 220 to execute the second depth model 270 over images in the training data 290 to produce corresponding depth maps. As noted previously, the training at 650 occurs in a similar manner as to the training at 620 with the exception of using different training data (i.e., the filtered data) and the model 270. Of course, as previously highlighted, the second depth model 270 may actually be the same model as the first depth model 260 that is either a separate instance or is reset from the previous training (i.e., internal weights are re-initialized to remove the learned aspects from block 620). Of course, in further embodiments, the second depth model 270 may have a different architecture than the first depth model 260. In any case, training the second depth model 270 with the filtered training data 290 improves the resiliency of the second depth model 270 against scale ambiguities within learned aspects of the second depth model 270 that may result from training using appearance-based loss functions.

Additionally, it should be appreciated that the network module 220 can further leverage the second depth model 270, once trained, to analyze monocular images from the camera 126 and provide the depth maps 280 to additional systems/modules in the vehicle 100 in order to control the operation of the modules and/or the vehicle 100 overall. In still further aspects, the network module 220 communicates the depth map 280 to a remote system (e.g., cloud-based system) as, for example, a mechanism for mapping the surrounding environment or for other purposes (e.g., traffic reporting, etc.). As one example, the network module 220, in one approach, uses the depth map 280 to map locations of obstacles in the surrounding environment and plan a trajectory that safely navigates the obstacles. Thus, the network module 220 may, in one embodiment, control the vehicle 100 to navigate through the surrounding environment.

In further aspects, the network module 220 conveys the depth map 280 to further internal systems/components of the vehicle 100, such as the autonomous driving module 160. By way of example, in one arrangement, the network module 220 generates the depth map 280 using the trained second depth model 270 and conveys the depth map 280 to the autonomous driving module 160 in a particular scale that the module 160 accepts as an electronic input. In this way, the depth system 170 informs the autonomous driving module 160 of the depth estimates to improve situational awareness and planning of the module 160. It should be appreciated that the autonomous driving module 160 is indicated as one example, and, in further arrangements, the network module 220 may provide the depth map 280 to the module 160 and/or other components in parallel or as a separate conveyance.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the depth system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140 and, thus, may be partially or fully autonomous.

The processor(s) 110, the depth system 170, and/or the autonomous driving module(s) 160 can be operatively connected to communicate with the various vehicle systems 140 and/or individual components thereof. For example, returning to FIG. 1, the processor(s) 110, the depth system 170, and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140.

The processor(s) 110, the depth system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the autonomous driving module(s) 160 can control the direction and/or speed of the vehicle 100. The processor(s) 110, the depth system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine a position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A depth system for self-supervised training for monocular depth estimation, comprising:
one or more processors;
a memory communicably coupled to the one or more processors and storing:
a training module including instructions that when executed by the one or more processors cause the one or more processors to:
filter one or more disfavored images from first training data to produce second training data that is a sub-sampled version of the first training data, wherein the one or more disfavored images correspond with one or more anomaly maps within a set of depth maps and are associated with objects moving at a similar speed as a camera that acquired a monocular video from which the first training data is derived, the anomaly maps being identified by analyzing individual maps of the depth maps for anomalous discontinuities corresponding to regions of disproportionate depths, wherein a first depth model is trained according to the first training data and generates the depth maps from the first training data after initially being trained with the first training data, and
train a second depth model according to a self-supervised training process using the second training data; and
a network module including instructions that when executed by the one or more processors cause the one or more processors to provide the second depth model to infer distances from monocular images.

2. The depth system of claim 1,
wherein the training module includes instructions to analyze the individual maps of the depth maps including instructions to analyze points below a ground plane within the individual maps to identify respective ones of the points that exhibit surface normals directed upwards within a defined threshold.

3. The depth system of claim 1,
wherein the anomaly maps exhibit infinite-depth aberrations as defined according to having points below a ground plane that satisfy a defined threshold.

4. The depth system of claim 1, wherein the training module further includes instructions to train the first depth model according to the self-supervised training process using the first training data that comprises pairs of training images derived from a monocular video, and
wherein the network module includes instructions to compute, using the first depth model, the depth maps for the training images of the first training data.

5. The depth system of claim 1, wherein the training module includes instructions to train the second depth model using the second training data to improve resiliency of the second depth model against scale ambiguities within learned aspects of the second depth model, and
wherein the first depth model and the second depth model are comprised of a same machine learning architecture.

6. The depth system of claim 1, wherein the training module includes instructions to filter the disfavored images to remove the disfavored images from the first training data to generate the second training data without characteristics that induce learning aberrations that result in infinite depth anomalies,
wherein the training module includes instructions to train the second depth model using the second training data including instructions to generate an appearance-based loss to update the second depth model, and wherein the first depth model and the second depth model are machine learning algorithms that function to generate depth estimates of a scene from a monocular image.

7. The depth system of claim 1, wherein the self-supervised training process is a self-supervised structure from motion (SfM) training process that accounts for motion of a camera between training images of separate pairs derived from a monocular video, and
wherein the self-supervised training process uses an appearance-based loss function that includes at least a photometric loss.

8. The depth system of claim 1, wherein the network module includes instructions to provide the distances to one or more of: an autonomous driving module, and an advanced driving assistance system.

9. A non-transitory computer-readable medium for self-supervised training for monocular depth estimation and including instructions that when executed by one or more processors cause the one or more processors to:
filter one or more disfavored images from first training data to produce second training data that is a sub-sampled version of the first training data, wherein the one or more disfavored images correspond with one or more anomaly maps within a set of depth maps and are associated with objects moving at a similar speed as a camera that acquired a monocular video from which the first training data is derived, the anomaly maps being identified by analyzing individual maps of the depth maps for anomalous discontinuities corresponding to regions of disproportionate depths, wherein a first depth model is trained according to the first training data and generates the depth maps from the first training data after initially being trained with the first training data;
train a second depth model according to a self-supervised training process using the second training data; and
provide the second depth model to infer distances from monocular images.

10. The non-transitory computer-readable medium of claim 9,
wherein the instructions to analyze the individual maps of the depth maps include instructions to analyze points below a ground plane within the individual maps to identify respective ones of the points that exhibit surface normals directed upwards within a defined threshold.

11. The non-transitory computer-readable medium of claim 9,
wherein the anomaly maps exhibit infinite-depth aberrations as defined according to having points below a ground plane that satisfy a defined threshold.

12. The non-transitory computer-readable medium of claim 9, wherein the instructions include instructions to train the first depth model according to the self-supervised training process using the first training data that comprises pairs of training images derived from a monocular video, and
wherein the instructions include instructions to compute, using the first depth model, the depth maps for the training images of the first training data.

13. The non-transitory computer-readable medium of claim 9, wherein the instructions to train the second depth model using the second training data improve resiliency of the second depth model against scale ambiguities within learned aspects of the second depth model, and
wherein the first depth model and the second depth model are comprised of a same machine learning architecture.

14. A method comprising:
filtering one or more disfavored images from first training data to produce second training data that is a sub-sampled version of the first training data, wherein the one or more disfavored images correspond with one or more anomaly maps within a set of depth maps and are associated with objects moving at a similar speed as a camera that acquired a monocular video from which the first training data is derived, the anomaly maps being identified by analyzing individual maps of the depth maps for anomalous discontinuities corresponding to regions of disproportionate depths, and wherein a first depth model is trained according to the first training data and generates the depth maps from the first training data after initially being trained with the first training data;
training a second depth model according to a self-supervised training process using the second training data; and
providing the second depth model to infer distances from monocular images.

15. The method of claim 14,
wherein analyzing the individual maps of the depth maps includes analyzing points below a ground plane within the individual maps to identify respective ones of the points that exhibit surface normals directed upwards within a defined threshold.

16. The method of claim 14, wherein the anomaly maps exhibit infinite-depth aberrations as defined according to having points below a ground plane that satisfy a defined threshold.

17. The method of claim 14, further comprising:
training the first depth model according to the self-supervised training process using the first training data that comprises pairs of training images derived from a monocular video; and
computing, using the first depth model, the depth maps for the training images of the first training data.

18. The method of claim 14, wherein training the second depth model using the second training data improves resiliency of the second depth model against scale ambiguities within learned aspects of the second depth model, and
wherein the first depth model and the second depth model are comprised of a same machine learning architecture.

19. The method of claim 14, wherein filtering the disfavored images removes the disfavored images from the first training data to generate the second training data without characteristics that induce learning aberrations that result in infinite depth aberrations,
wherein training the second depth model using the second training data includes generating an appearance-based loss to update the second depth model,
wherein the first depth model and the second depth model are machine learning algorithms that function to generate depth estimates of a scene from a monocular image.

20. The method of claim 14, wherein the self-supervised training process is a self-supervised structure from motion (SfM) training process that accounts for motion of a camera between training images of separate pairs derived from a monocular video,
wherein the self-supervised training process uses an appearance-based loss function that includes at least a photometric loss function.

* * * * *